United States Patent [19]
Ternoir et al.

[11] Patent Number: 5,275,645
[45] Date of Patent: Jan. 4, 1994

[54] POLYSILOXANE COATING

[75] Inventors: Leonard R. Ternoir, Brea; Raymond E. Foscante, Yorba Linda; Roland L. Gasmena, Anaheim, all of Calif.

[73] Assignee: Ameron, Inc., Pasadena, Calif.

[21] Appl. No.: 980,908

[22] Filed: Nov. 24, 1992

[51] Int. Cl.$^5$ ............................................... C09K 3/18
[52] U.S. Cl. ................................. 106/2; 106/287.12; 106/287.13; 106/287.14; 106/287.16; 106/287.19; 427/384
[58] Field of Search ............... 106/2, 287.12, 287.13, 106/287.14, 287.16, 287.19; 427/384

[56] References Cited
U.S. PATENT DOCUMENTS

| | | | |
|---|---|---|---|
| 4,080,190 | 3/1978 | Law et al. | 106/18.35 |
| 4,227,929 | 10/1980 | Law et al. | 106/18.36 |
| 4,311,629 | 1/1982 | Gysegem | 106/15.05 |

*Primary Examiner*—Helene Klemanski
*Attorney, Agent, or Firm*—Christie, Parker & Hale

[57] ABSTRACT

A protective coating is made by polymerizing at ambient temperatures a silicon-oxygen bond compound selected from a group consisting of oxysilanes having side groups selected from the group consisting hydrogen and alkyl, aryl, hydroxyalkyl, alkoxyalkyl and hydroxyalkoxyalkyl groups containing up to six carbon atoms, where there are at least two hydrolyzable side groups for polymerization, and where the number of repeating units of the oxysilane is in the range of from 1 to 5, and/or silicone intermediates with side groups selected from the group consisting of hydrogen, the hydroxy group and alkyl, aryl and alkoxy groups having up to twelve carbon atoms and having an average molecular weight of up to 5000. The polymerization is catalyzed by a basic compound selected from a group consisting of mercaptans, silane substituted amines, polyamides, polyimides, amidoamines, and aliphatic amine compounds and aromatic amine compounds; and an organotin compound. Carbinols with at least two carbon bonded hydroxy groups per carbinol may also be included in the coating composition.

38 Claims, No Drawings

POLYSILOXANE COATING

FIELD OF THE INVENTION

This invention relates to the formation of a high performance binder used in inorganic protective coatings that serves to enhance the coatings weatherability, heat resistance and provides a surface finish ranging from flat to high gloss.

BACKGROUND OF THE INVENTION

Protective coatings are needed to protect a variety of substrates from premature deterioration and failure due to the particular environment in which they are used. Such substrates include concrete, steel and other industrial building or structural materials that are typically used in environments well known for their corrosive, chemical, mechanical, thermal and atmospheric degradation. Such applications include steel structures used in industrial chemical processing plants, oil refineries, power plants, offshore drilling platforms and the like. To be effective in such applications, the protective coating should protect against a variety of conditions. It must be a corrosion barrier; must be weatherable, that is, resistant to ultraviolet light and other components of sunlight as well as environmental constituents; must be heat resistant; and must be chemically resistant.

The performance of a protective coating is greatly dependent on the resin system used as the binder for the composition. Coating binders have historically been chosen from the following categories of resins: epoxy, polyurethane, silicone, silicate, acrylic, vinyl, alkyd, chlorinated rubber and the like. Some of these generic classes require a high level of organic solvent to dissolve them and cannot be used in light of today's raised environmental consciousness. Accordingly, the state-of-the-art in high performance coatings is defined primarily by epoxy, polyurethane, silicone and silicate binders.

Each of these resins are known for their individual unique characteristics. For example, an epoxy resin binder provides the properties of enhanced corrosion and chemical resistance. A polyurethane resin binder provides enhanced weatherability and appearance. A silicone resin binder provides enhanced heat resistance and weatherability. Silicate resin binders, when combined with zinc dust, provide long-lived corrosion resistance. However, each resin of this current class of binders is also characterized as having limited performance potentials in certain areas. Epoxy resin binders tend to cure slowly at temperatures below 10° C. and have poor weatherability properties. Polyurethane resin binders are moisture sensitive, derived from toxicologically hazardous polyisocyanates, and known to retain their appearance for only three to seven years. Silicones require baking or high heat curing to achieve full performance and are marginal film formers.

True advancements in the state-of-the-art for protective coatings require substantial improvements in weathering (primarily ultraviolet resistance), heat resistance, chemical resistance, and corrosion control. Polysiloxane chemistry offers the potential for providing many of these advancements. Polysiloxane is defined as a polymer consisting of repeating silicon-oxygen atoms in the backbone that imparts several advantages over previously used carbon-based polymer binders; one of these advantages being an enhanced chemical and thermal resistance due to the silicon-oxygen bond. Polysiloxane's polymer linkage is also transparent to ultraviolet light making it resistant to ultraviolet degradation. Finally, polysiloxane is not combustible and is resistant to a wide range of chemicals and solvents, including acids.

Exemplary of polysiloxane coating compositions is that described by Law et al. in U.S. Pat. No. 4,113,665. Law discloses a process for making chemically resistant coatings by reacting, in an acid medium, trialkoxysilanes and silicone intermediates. The Law invention represented a major advancement in polysiloxane based coatings technology because it provided a means of providing ambient temperature curing of polysiloxane compositions. Unlike conventional silicone compositions, the Law patent provided a process for achieving the full chemical and heat resistance properties of silicone based materials without the need for high temperature curing.

Although the process disclosed in the Law patent provided the improvement of ambient temperature curing, it has certain inherent limitations. The use of an acid catalyzed reaction requires a prehydrolysis step that necessitates a considerable input of energy for an extended period of time, thereby increasing the manufacturing cost of such products. The acid catalyzed production of polysiloxane produced protective coatings poorer than desired, were limited to either semi-gloss or flat finishes. Such an acid catalyzed composition must be marketed as a two-part product. The use of such a two-part product requires that each part be combined immediately before application. Often it is desirable to have a coating composition in a single container for field applications where mixing of two parts may not be reliable.

It is, therefore, highly desirable to provide a high performance protective coating binder composition affording improved protection from corrosion and attack by chemicals, solvents, weathering, and heat where the binder can be manufactured economically and cured at ambient temperature. It is further desired that the binder produces a protective coating having a high-gloss finish with a relatively low viscosity that can be supplied in a one-package system and applied without a large degree of organic solvent thinning.

SUMMARY OF THE INVENTION

Very generally speaking, this invention provides a protective coating by polymerizing at ambient temperatures

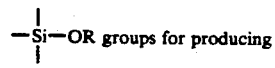 groups for producing

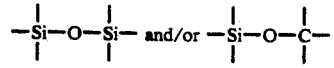

polymers using an amine catalyst and an organometallic catalyst. A carbinol may be copolymerized with such oxysilanes and/or silicones.

A major portion of the binder of this coating is prepared by combining in an organic basic solution:

(A) a silicon-oxygen bond compound selected from a group consisting of:
(i) oxysilanes having the formula

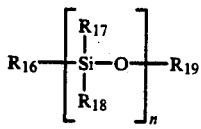

where $R_{16}$, $R_{17}$ and $R_{18}$ are independently selected from the group consisting of hydrogen and alkyl, aryl, cycloalkyl, alkoxy, aryloxy, hydroxyalkyl, alkoxyalkyl and hydroxyalkoxyalkyl groups containing up to six carbon atoms, and where $R_{19}$ is selected from the group consisting of hydrogen and alkyl and aryl groups, where at least two of the groups are oxy substituents for polymerization, and where n is in the range of from 1 to 5; and (ii) silicone intermediates of the formula

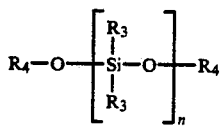

where each $R_3$ is independently selected from the group consisting of the hydroxy group and alkyl, aryl and alkoxy groups having up to six carbon atoms, where each $R_4$ is independently selected from the group consisting of hydrogen and alkyl and aryl groups having up to twelve carbon atoms, and where n is selected so that the average molecular weight of the silicone intermediates is up to 5000:

(B) a basic compound preferably selected from a group consisting of mercaptans, silane substituted amines, polyamides, polyimides, amidoamines, and aliphatic amine compounds and aromatic amine compounds having the general formula

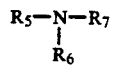

where $R_5$ is selected from a group consisting of hydrogen, and aryl and alkyl groups having up to twelve carbon atoms, and $R_6$ is selected from the group consisting of hydrogen, and aryl and alkyl groups having up to twelve carbon atoms, and where $R_7$ is selected from a group consisting of alkyl, aryl and hydroxyalkyl groups having up to twelve carbon atoms; and (C) an organometallic compound.

Typically, a coating containing these binders comprises from 5 to 85% by weight binder, however, if a transparent coating is desired, there may be 100% binder. A variety of fillers, pigments, plasticizers, flow control additives and other ingredients may be included in the coating composition. The coating composition contains from 80 to 100% solids, i.e. typically no more than 20% solvent.

Coatings containing these binders exhibit improved resistance to corrosion, weathering, heat, chemical attack, and solvent attack, including resistance to acids and salt water. Additionally, coatings made from such binders are not limited to semi-gloss or flat finishes and can be formulated to yield high-gloss films. The coatings are curable at ambient temperatures and do not require the energy intensive and time consuming pre-hydrolysis step inherent in an acid catalyzed trialkoxysilane reaction.

Coatings containing the binders of this invention can be supplied in a one-package system and can be applied directly to a surface to be treated. Such coatings can also be applied as a top coat over primers such as inorganic zinc silicate without application related bubbling. Additionally, the coatings can be applied by either spray or brush without need for organic solvent thinning. This is true because the present invention produces a polysiloxane binder having a low viscosity.

These and other features, aspects and advantages of the present invention will become more apparent from the following description and appended claims.

DETAILED DESCRIPTION

Binders for preparing coatings resistant to attack by solvents, chemicals, heat and weathering have as significant components an oxysilane and/or a silicone, an amine catalyst, and an organotin catalyst for promoting hydrolysis and polycondensation of the oxysilane. A binder may also include carbinols as co-resins with the oxysilane as a coating composition. There may also be pigments, fillers, plasticizers, and solvents in the coating composition. Siloxanes may also be referred to as oxysilanes, and are sometimes simply referred to as silanes. As used herein, oxysilane refers to compositions having the formula

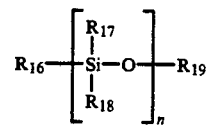

where n is from 1 to 5. Where solvents are included in the composition for reducing viscosity, n may range somewhat higher than 5. In available compositions where n =2 or more, the number of repeating units is an average number of units. For example, in a composition with n =5, some of the oxysilane may have three or four repeating units and some have six or seven, but most have five and the average is about five.

In this formula each $R_{16}$, $R_{17}$ and $R_{18}$ is independently selected from the group consisting of hydrogen and alkyl, aryl, cycloalkyl, alkoxy, aryloxy, hydroxyalkyl, alkoxy-alkyl and hydroxyalkoxyalkyl groups containing up to six carbon atoms. $R_{19}$ is selected from the group consisting of hydrogen and alkyl and aryl groups. In most cases, at least two of the $R_{16}$, $R_{17}$ and $R_{18}$ groups are hydrolyzable oxy substituents for polymerization. Some chlorosilane, silanols and other equivalent oxysilanes may also be included. When n =1, at least one of the $R_{16}$, $R_{17}$ and $R_{18}$ groups is preferably selected from the group consisting of alkoxy and aryloxy groups containing up to six carbon atoms. Also, when n =2 or more and lower cross linking is desired, some of the hydrolyzable oxy groups may be replaced by non-hydrolyzable groups.

An important ingredient of the binder may have n =1 and comprises trifunctional materials such as trialkoxysilanes, triaryloxysilanes or trialkaryloxysilanes having the formula

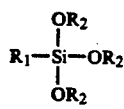

where $R_1$ is selected from the group consisting alkyl, aryl, and cycloalkyl groups containing up to six carbon atoms and where each $R_2$ is independently selected from the group consisting of alkyl, aryl, hydroxyalkyl, alkoxyalkyl and hydroxyalkoxyalkyl groups containing up to six carbon atoms.

Tetrafunctional oxysilanes where $n = 1$ may also be used to some extent, but an entirely tetrafunctional oxysilane tends to be too brittle for a successful coating composition. Difunctional oxysilanes may also be used as chain extenders for more flexibility in the final coating. A small amount of monofunctional oxysilane may serve as an internal plasticizer. The preferred oxysilanes are, however, trifunctional.

A desirable oxysilane has $n = 2$, which in effect, is a prepolymerization of the trifunctional $n = 1$ oxysilane. The higher molecular weight oxysilane may be desirable in some coating compositions since it is less volatile than the $n = 1$ material.

With reference to the oxysilanes, the side groups $R_{16}$, $R_{17}$ and $R_{18}$ contain up to six carbon atoms so that the oxysilane can be easily hydrolyzed. Each side group can be the same or different. Generally, the lower the molecular weight of the side groups, the less steric hindrance present to interfere with hydrolysis of the oxysilane. Generally, alkyl groups are preferred; however, to provide a coating with superior heat resistance, some of the side groups can be a phenyl group. Exemplary nonhydrolyzable side groups are the methyl, ethyl, n-propyl, isopropyl, n-butyl, isobutyl, cyclohexyl and phenyl groups.

The organic group in a hydrolyzable OR group is preferably selected from the group consisting of alkyl, aryl, hydroxyalkyl, alkoxyalkyl and hydroxyalkoxyalkyl groups containing up to six carbon atoms so that the alcohol analogue of the organic group formed during hydrolysis of the oxysilane has sufficient volatility to evaporate so the binder can cure. Generally, the higher the molecular weight of the organic group, the lower the volatility of its alcohol analogue. Exemplary of the organic groups are the methyl, ethyl, n-propyl, isopropyl, n-butyl, isobutyl, hydroxymethyl, hydroxypropyl, methyloxymethyl, methyloxyethyl, hydroxyethyloxyethyl groups, and the like.

For quick hydrolysis and to obtain a fast drying coating, preferably each hydrolyzable side group comprises a methyl or ethyl group. However, under certain conditions such as coating interior surfaces under high temperature operating conditions when low volatility is required, the organic group can be a higher molecular weight group such as the methyloxyethyl or ethyloxyethyl group.

In lieu of, or preferably in addition to, the oxysilanes, the coating composition comprises silicone intermediates of the formula

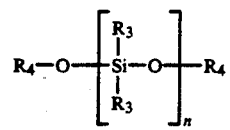

where each $R_3$ is independently selected from the group consisting of the hydroxy group and alkyl, aryl and alkoxy groups having up to six carbon atoms, where each $R_4$ is independently selected from the group consisting of hydrogen and alkyl and aryl groups having up to twelve carbon atoms, and where n is selected so that the average molecular weight of the silicone intermediates is up to 5000. It will, of course, be understood that in a silicone intermediate at least two of the $R_3$ groups are functional alkoxy groups or the like for polymerization.

Rather broadly speaking, the principal polymer forming the binder is provided by reaction of

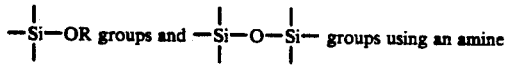

catalyst. As pointed out hereinafter, some of the bonds in the polymer may be —C—O—Si— bonds instead of entirely —Si—O—Si—.

Generally the lower the molecular weight of $R_4$, the more quickly the binder formed from a trialkoxysilane and silicone cures because of more rapid evaporation of the alcohols formed. Therefore, preferably each $R_3$ and each $R_4$ is selected from the group consisting of the methyl, ethyl and phenyl groups, and in addition for the $R_3$ groups providing functionality for condensation with hydrolyzed oxysilanes, $R_3$ is selected from the hydroxy group and low molecular weight alkoxy groups.

Exemplary of such groups which $R_3$ can be are, in addition to the methyl, ethyl and phenyl groups, n-propyl, isopropyl, n-butyl, isobutyl and the like. When high heat resistance is desired some of the $R_3$ groups can be the phenyl group. Exemplary of groups which $R_4$ can be are, in addition to the methyl and ethyl groups, n-propyl, isopropyl, n-butyl, isobutyl, and the like may be used.

In the above formula for the silicone intermediates n is selected so that the average molecular weight of the silicone molecules is up to 5000. Molecular weights greater than about 5000 are not readily available and would make the coating composition too viscous. Preferably, a coating composition has a viscosity of about 1000 to 3000 cps.

For a composition of binder which undergoes at least initial curing without exposure to water, it is desirable that at least a portion of the R groups of the oxysilane or silicone comprise a silanol termination or hydroxyl group for condensation without added water. In an exemplary composition, the silicon compounds comprise up to about five percent silanol terminations.

The precursors of the polymer are combined in the presence of a generally nonaqueous organic basic solution. As described hereinafter, some prehydrolysis after the composition is formulated may be provided in some embodiments. The base is chosen from the group of amines and is used to catalyze the formation of hydroxyl and polymerization of the silicon compounds. The basic solution comprises an amine compound having the general formula

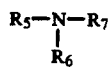

where $R_5$ is selected from a group consisting of hydrogen, and aryl and alkyl groups having up to twelve carbon atoms, where $R_6$ is selected from the group consisting of hydrogen, and aryl and alkyl groups having up to twelve carbon atoms, and where $R_7$ is selected from a group consisting of alkyl, aryl and hydroxyalkyl groups having up to twelve carbon atoms.

Exemplary amines useful as curing agents include dimethyl methanolamine, dimethyl ethanolamine, dimethyl propanolamine, dimethyl butanolamine, dimethyl pentanolamine, dimethyl hexanolamine, methyl ethyl methanolamine, methyl propyl methanolamine, methyl ethyl ethanolamine, methyl ethyl propanolamine, mono isopropanolamine, methyl diethanolamine, triethanolamine, diethanolamine, ethanolamine.

Preferred amines include dimethyl ethanolamine and ethyl ethanolamine. The amount of amine catalyst used controls the curing rate of the composition and can readily be varied to achieve a desired cure.

In lieu of or in addition to the amines mentioned above, one may use an aminosilane, i.e., a oxysilane having amino functionality. Preferably such an aminosilane has the general formula

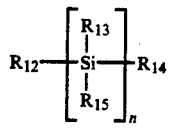

wherein $R_{12}$ is selected from the group consisting of aliphatic and aromatic amines containing from 1 to 6 nitrogen atoms and from 1 to 6 carbon atoms, $R_{13}$, $R_{14}$, and $R_{15}$ are independently selected from the group consisting of alkoxy and aryloxy groups having up to twelve carbon atoms, and n is in the range of from 1 to 6. Such an aminosilane becomes part of the polymer backbone during condensation. One may also use precursors or latent amines such as oxazolidine which may be equivalent to an amine for this purpose.

An organometallic compound, preferably an organotin compound, is combined with the reactants to catalyze the reaction. Suitable organotin compounds have the general formula

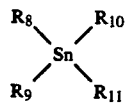

where $R_8$, $R_9$, $R_{10}$ and $R_{11}$ are selected from a group consisting of alkyl, aryl, and alkoxy groups having up to eleven carbon atoms, and any two of $R_8$, $R_9$, $R_{10}$ and $R_{11}$ are also selected from a group consisting of inorganic atoms including halogens, sulphur or oxygen.

Organotin compounds useful as catalysts include tetramethyltin, tetrabutyltin, tetraoctyltin, tributyltin chloride, tributyltin methacrylate, dibutyltin dichloride, dibutyltin oxide, dibutyltin sulfide, dibutyltin acetate, dibutyltin dilaurate, dibutyltin maleate polymer, dibutyltin dilaurylmercaptide, tin octoate, dibutyltin bis-(isooctylthioglycolate), butyltin trichloride, butylstannoic acid, dioctyltin dichloride, dioctyltin oxide, dioctyltin dilaurate, dioctyltin maleate polymer, dioctyltin bis(isooctylthioglycolate) dioctyltin sulfide, dibutyltin 3-mercapto propionate).

The organotin compound is used with the amine to catalyze the formation of hydroxide and polymerization of the silicon compound. An exemplary organotin compound comprises dibutyltin dilaurate. The dibutyltin, when combined with the amine acts synergistically to catalyze the curing process and assure the rapid formation of a hard glossy film. Although it is believed that the synergistic effect of the organotin compound and the amine is mechanistic in character, the exact mechanism is not known.

Other organometallic compounds with less active curing ability may be substituted, such as organic iron, nickel, copper, platinum or lead compounds.

The binders of this invention may also be reaction products of the above-described trifunctional oxysilanes and/or silicones with carbinols having an average of at least two carbon bonded hydroxy groups per carbinol and having an average molecular weight of at least 62. Since the carbinols particularly useful in the polymer are at least difunctional, the term polyol is also used herein as interchangeable with carbinol.

With reference to the carbinol reactant, it may be partially esterified or otherwise modified providing it has at least two free hydroxy groups per molecule to participate in the reaction. Other hydroxy-bearing materials may be present and may or may not react with the oxysilane or silicone. Thus, the carbinol-silane reaction mixture may contain a monohydroxy reactant such as an alkanol or the like, and such monohydroxy material may be mixed with the carbinol, oxysilane and/or silicone prepolymer during or after the time the latter is formed.

Although the polyol or monohydroxy materials may have a molecular weight of up to about 400 or more, especially if they are polyoxalkaline carbinols such as the polyoxalkaline glycols, e.g. polyethylene glycols or alkyl-capped polyalkoxysilane polyols, the polyols and monohydroxy materials often have molecular weights up to about 100. The lowest molecular weight possible for the polyol is 62, the molecular weight of ethylene glycol. Higher molecular weight polyols are usually a minor molar amount of the total carbinol employed, with the lower molecular weight carbinol being the major amount.

The polyols may include ethylene glycol, propylene glycol and glycerol. Ethylene glycol is the most highly preferred polyol reactant from both product quality and cost standpoints. Other polyols which may be employed in making the binders of the invention include diethylene glycol, trimethylene glycol, triethylene glycol, dipropylene glycol, tripropylene glycol, polyethylene glycols, trimethyl propanol, 1,6- or 2,6-hexanediol, neopentyl glycol, 1,3-butylene glycol, pentaerythritol, hexylene glycol, partially-esterified polyols, cyclopentanediol and the like. Mixtures of these polyols may also be reacted, especially those which contain a major portion of ethylene glycol, propylene glycol or glycerol.

The preferred carbinols comprise hydroxyl functional acrylic resins, alkyd resins or polyester resins or carboxylic acid functional acrylic resins, epoxy resins, or polyester resins. Such carbinols are selected to achieve desirable properties in the coating and because they may often make a less costly coating than a composition containing entirely oxysilanes and silicones. The carbinols may be advantageous for increasing adhesion of a binder to some substrates or changing mechanical properties of a coating. They may reduce abrasion resistance, but improve impact resistance. Generally speaking, carbinols tend to reduce resistance to ultraviolet radiation, heat, and in some instances certain chemicals, as compared with a coating made entirely with silicon bonds. It may be noted that even with a reduction in ultraviolet resistance, the coating compositions are still better than polyurethane coatings.

Exemplary carbinol resins are available from a variety of commercial sources and include Desmophen 800 from Farbenfabriken Bayer AG, New York, N.Y.; Joncryl resins 500, 586, 587, 588, 611, 678, 67, etc. available from S. C. Johnson and Son, Inc., Racine Wis.; and Cargill resins 66-6619, 66-6621, 66-6638, 66-6686 and 66-6695. Desmophen, Joncryl, and Cargill are trademarks.

The choice of carbinol may affect the mechanical properties of the product. For instance, if higher molecular weight carbinols are used, proper adjustment to lower ratios of carbinol with respect to the oxysilane reactant on the basis of the number of hydroxy groups per $R_2$ group in the oxysilane is advisable, and the extent of alcohol removal from the reaction mixture may be increased to obtain a hard coating with good adhesion. The gelling characteristics of the reaction of the mixture and the properties of the coating compositions may be affected, depending on the choice of the oxysilane reactant, and the extent of

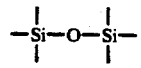

and silicon-carbon bonds that may be present. The use of high proportions of less volatile, higher molecular weight glycols or other carbinols having other groupings thereon, may lead to products which are slow-curing and give soft coatings due to their high viscosity.

Particularly preferred polyfunctional carbinols are acrylic and polyester polymers having molecular weights up to 10,000. These promote good adhesion and have satisfactory stability for use in adverse environments.

The chemical and physical characteristics of the binders of this invention depend upon the molecular weight, functionality, and molecular weight ratios of the reactants. As the degree of functionality, i.e., the number of hydroxy and alkoxy groups, of the oxysilanes, silicones and carbinols increases, the cross link density of the resultant binder increases. This may be desirable for improved resistance to chemical and solvent attack. The resultant binder may exhibit less adhesion to a surface to be coated. On the other hand, as the degree of functionality of the carbinol and the silicon compounds decreases, less cross-linking results and less resistance to chemical and solvent attack is exhibited by the binder.

Similarly, the weight ratio of the oxysilane and/or silicone to the carbinol affects the characteristics of the binder. Preferably, the weight ratio of oxysilane and/or silicone to carbinol is less than 20:1 so that a binder having sufficient flexibility to form a continuous coating can be produced. Preferably the weight ratio of oxysilanes and/or silicones to carbinols is greater than 5:1 and the weight ratio of silicones to oxysilanes is as much as 3:2 for higher degrees of cross linking so that the coating formed has adequate solvent and chemical resistance to protect the underlying surface. When lower cross linking is acceptable, the ratio of silicone to oxysilane may be as much as 10:1. At weight ratios less than 5:1 and 1:10 for the oxysilane and/or silicone to carbinol, and oxysilane to silicone, respectively, the binder is softer and exhibits lowered resistance to solvent and chemical attack.

In order to prepare a binder having optimum chemical and physical properties, the weight ratios, molecular weight and degree of functionality of the reactants are all varied within the ranges described above. For example, if the degree of functionality of the carbinols is increased, then to provide a binder with substantially the same physical and chemical characteristics, it is appropriate to decrease the weight ratio of oxysilane to carbinol and/or to use a higher molecular weight carbinol.

The end uses of compositions made with combinations of silicones and oxysilanes include those where chemical and/or thermal resistance are important. Such compositions are also useful as weatherable top coats over other compositions. A composition made solely with silicones may be useful as a weatherable topcoat. A composition made only with oxysilanes may be reacted in situ to form a silicone so that it is not unduly brittle. Such coatings tend to be somewhat costly.

Coatings with combinations of silicones and carbinols may be used as weatherable top coats with properties tailored to specific applications. There tends to be a lower level of cross linking than in coatings made with combinations of oxysilanes, silicones and carbinols. Having all of these ingredients tends to simplify tailoring the properties to particular end uses.

A coating made solely with oxysilanes and carbinols tends to have lower ultraviolet resistance, comparable to polyurethanes, but can be quite useful where protected from ultraviolet radiation by a topcoat or where ultraviolet is not a problem.

Other reactants in addition to the trialkoxysilanes, silicones and carbinols discussed above can be used to prepare the binders of this invention. For example, minor amounts of dialkoxysilanes such as dimethyl dimethoxysilane can be used. However, only minor amounts of dialkoxysilanes are used to form the binders because they lead to formation of binders containing less cross-linking and therefore less resistance to solvent and chemical attack.

When the trialkoxysilanes are reacted with the silicone intermediates and/or aliphatic carbinols in the presence of an organic basic solution and an organotin compound, it is believed that the reaction proceeds by the following mechanism:

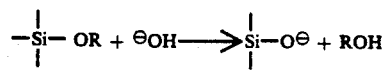

-continued

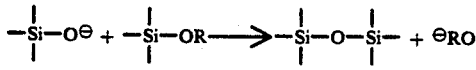

In the presence of atmospheric moisture, or when water is added as a reactant, the amine reacts with the water to form an hydroxide ion. The reaction then proceeds by hydrolysis of the oxysilane, causing the release of $R_2$—OH groups followed by a polycondensation reaction between the hydrolyzed oxysilane and the other reactants present.

Furthermore, it is not necessary to have water present for polymerization to proceed. Silanol and carbinol terminations present in the precursors can react and polymerize anhydrously. An exemplary composition has up to about five percent silanol terminations. Water accelerates the reaction, but the absence of water does not prevent reaction. Eventually, to form all of the desired crosslinking, a stoichiometric proportion of hydroxyl groups or water is required. With a lower than stoichiometric amount of hydroxyl groups in the precursor resins, gelling of the coating to a firm solid may occur, with further hardening occurring as atmospheric water vapor contacts the coating. Compositions can readily be provided which do not rely on relative humidity to proceed.

When the binder precursors include a substantial proportion of carbinol and/or silanol terminations, condensation is inhibited in the mixture by presence of the alcohol product of condensation. For example, if the starting material comprises triethoxysilane, the retention of ethyl alcohol in the coating composition prevents gelling of the mixture in the storage container. Evaporation of the ethyl alcohol reaction product from a film permits the polymerization to proceed.

Empirically, this base-catalyzed reaction is much faster than that of the acid catalyzed reaction because it does not require the prehydrolysis of the oxysilane. This is believed due to the synergistic catalytic effect of the organotin compound and the amine.

Under basic conditions with water present, the tendency for chain extension and cross-linking are kinetically controlled and about equally favored throughout most of the reaction span. Provided that the reactive components of the binder are uniformly dispersed, when the cure reaction begins, the cure matrix is fairly uniformly structured and has a higher cross-link density than that formed in an acid-based system which must be prehydrolyzed. This is due to the fact that it is the trifunctional oxysilane and/or low molecular weight silicone intermediates which are responsible for the cross-linking.

In the base catalyzed system, the monomeric oxysilane and/or low molecular weight silicone intermediate is evenly distributed throughout the resinous blend, causing cross-links to form uniformly throughout the curing matrix. In the acid catalyzed system there is a tendency to favor chain extension reactions of the oxysilane rather than cross-linking, producing a high molecular weight prepolymer which must be dissolved in other components or solvents to be a sprayable composition.

The ability to utilize monomeric oxysilane and/or low molecular weight silicone intermediate provides greater latitude in tailoring the properties of the composition and resulting cured form. Access to some of the reactive groups in the hydrolyzed prepolymer resulting from the acid hydrolysis will be sterically hindered as cure progresses. This is less likely to occur in a base catalyzed system, where the reactive species are on a relatively small molecule (such as the $n=1$ or $n=2$ oxysilane or the low molecular weight of silicone resin) which can readily diffuse throughout the blend and maintain contact with reactive groups in the oxysilanes and silicone intermediates.

In the atmosphere, the reaction is driven by the presence of atmospheric moisture and the evaporation of the alcohol, thereby driving the equilibrium towards polymerization of the oxysilane and/or silicone with the other reactants. Additional water from atmospheric moisture or from immersion in either fresh or sea water after partial curing can complete the reaction. The end product is a thoroughly cross-linked structure of Si—O—Si and Si—O—C bonds.

A solvent in which both the oxysilane and water are miscible can be used to aid the base catalyzed reaction. Use of a solvent is sometimes desirable because it allows a faster reaction to occur where the precursors and water are miscible in the solvent and it permits control over the reaction mixture to permit easy application to a surface. Preferably, a volatile solvent is used so quick drying of a coating formed from the reaction mixture occurs. The effect of non-alcoholic solvents is control of the drying of the coating rather than the curing rate. Alcohol solvents control curing as well as drying.

Exemplary of such solvents which can be used are oxygenated solvents such as esters, ethers, alcohols, ketones, glycols, and the like. Specific solvents include for example, MIBK, MEK, acetone, n-propyl ketone, methyl isoamyl ketone, methyl propyl ketone, isopropanol, isobutyl alcohol, n-butyl alcohol, ethylene glycol monobutyl ether, propylene glycol monobutyl ether, triethylamine, n-butyl acetate, ethyl 3-ethoxypropionate, pentanone, 2-ethyl hexyl acrylate, isobutyl methyl acrylamide, isobornyl acrylate, etc. A particularly preferred solvent because of its evaporation rate is n-methyl pyrrolidone. Other preferred solvents include hexyl acetate and heptyl acetate. Lower alcohols are desirable for suppressing premature gelation.

Although a solvent is often desirable it is not required in a base catalyzed reaction because of the low viscosity of the polymer precursors and the usual absence of prehydrolysis. A sprayable, solvent-free composition is readily prepared. Solvents may be useful when the coating composition contains high proportions of fillers, pigments, etc. For example, the coating composition may contain 80% solids (including binder) and only 20% solvent.

It is desirable that a coating containing the binders of this invention dry to touch in less than about an hour and substantially completely cure overnight (i.e. in less than about eighteen hours). Dry to touch times longer than about an hour are generally unsatisfactory because the surface coated cannot be handled for subsequent processing steps until the coating has dried or set. In addition, a wet coating is easily contaminated with dust particles. Preferably a coating takes longer than about a half hour to dry because if the coating drys too fast, an uneven surface results, especially in overlap areas.

The suitability of a coating composition often depends upon the solvent used and the amount of solvent present. Generally, increasing the amount of solvent present lengthens cure time, lengthens shelf life, and decreases the viscosity of the reactants/solvent mixture. An amount of solvent which allows drying to occur in the range of from one-half to one hour is preferred.

The amount of solvent provided is a balance between the competing considerations of providing a product with sufficiently low viscosity that it can easily be applied to surfaces and at the same time provide a product with high solids content so that a thick film can be quickly formed. An advantage of a base catalyzed binder product is that its low viscosity permits spray application with little or no solvent thinning.

Coating compositions of this invention comprise not only a binder as described above, but may also comprise fillers. Conventional fillers can be used in the coatings. These include silica powder, talc (magnesium silicate), clays such as china clay (aluminum silicate), wollastonite (calcium silicate), calcium carbonate, barites (barium sulfate), barium metaborate, aluminum trihydrate, graphite, zinc, aluminum, copper and the like. Pigments such as iron oxide, aluminum oxide, titanium dioxide, and chrome green may also be used. Pigments containing lead should be avoided because of interference with cure. Organic pigments such as hansa yellow, phthalo green, and phthalo blue may also be used to color the product. Zinc oxide can also be used to aid film hardening. Barium metaborate is a preferred filler when the resistance to acids is desired because it has been found that coating compositions containing barium metaborate exhibit improved resistance to attack by acid.

When a coating exhibiting resistance to high temperatures is desired, a finally divided, particulate pigment or filler can be used. Exemplary of such fillers providing high heat resistance are barites (barium sulfate), mica, micaceous iron oxide, aluminum flake, glass flake, stainless steel flake, and the like. By proper selection of the binder and filler, heat stable coatings resistant to temperatures exceeding 1000° F. can be achieved.

As the ratio of binder to filler in a coating composition increases, the coating strength increases, and its adhesion to surfaces increases. The coating comprises preferably at least 5% by weight of the binder so the coating has sufficient strength and resistance to attack by chemicals, solvents, heat, and weathering to protect the underlying surface. Preferably less than 85% by weight of the binders is used so that the coating has adequate adhesion to prevent sloughing off in use.

Other materials commonly used in coating compositions may also be included. For example, the coating composition may include plasticizers for the binder such as esters or silicone oils. Phthalates work well as plasticizers. Flow control additives, wetting agents for pigment dispersion, and thixotropic agents such as fumed silica may also be included.

An advantage of the base catalyzed composition is that prehydrolysis is not required. Generally, as the degree of hydrolysis of the silicon compound used in a composition to prepare a coating increases, adhesion of the coating to the material to be protected worsens, cure time of the coating shortens, shelf life of the system shortens, and viscosity of the reaction mixture containing the silicon compound increases. Some hydrolysis is certainly tolerable in the base catalyzed composition, so rigorous exclusion of water is not mandatory. The base catalyzed composition is aggressive and prehydrolysis is not needed. There are, however, some base catalyzed formulations where prehydrolysis is desirable.

For a base catalyzed composition it is generally preferred that the degree of hydrolysis be in the range of from 0 to 50% to obtain a curing system which has good adhesion to most surfaces, dries to touch in the preferred drying time of from one half to one hour, cures overnight, has a shelf-life of at least six months and has sufficiently high thixotropy that it can be applied to vertical surfaces. If the degree of hydrolysis exceeds about 50%, premature gelling may occur, and a generally poorer barrier film is formed on a surface. The tolerable degree of hydrolysis depends on the precursors selected.

Degree of hydrolysis of the precursor is determined by the ratio of numbers of moles of water to hydrolyze the precursor to the number of moles of water required for complete hydrolysis. For example, complete hydrolysis of a trifunctional oxysilane requires 1.5 moles of water per mole of oxysilane.

A base catalyzed composition can be prepared and stored in a single container because of the low viscosity of the mixture and the minimal prehydrolysis. It may be preferable to employ a two-container composition, however, when the filler loading is relatively high. Pigments and the like may settle and be hard to resuspend in a single container. Thus, it may be preferable to store the pigments and the like in one container and mix them with the binder composition shortly before use.

The mixture of the reactants used for applying the coating of this invention should be provided in a moisture proof container so that evaporation of reaction products, hydrolysis and condensation do not occur prematurely, thus increasing the shelf life of the mixture. Metal cans are suitable.

Coatings containing these binders can be used for treating materials to protect them from weathering, solvents, including hydrocarbon solvents, salt water, chemicals such as sulphur dioxide, and heat. Illustrative of materials which can be treated are concrete; vitreous surfaces; and metallic surfaces such as the interior surfaces of petroleum tanker tanks used for carrying refined and unrefined petroleum, the interior surfaces of boiler stacks such as coal fired power plant stacks, and surfaces of offshore drilling platforms. Coatings containing these binders can also be used to protect other coatings such as inorganic coatings containing metallic zinc used to protect metallic surfaces from corrosion. When so used the coating with inorganic zinc provides corrosion resistance while the over or top coat containing a binder of this invention protects the inorganic zinc coating from chemical attack.

Coating compositions containing the binder of this invention can be applied to a surface to be treated by conventional techniques such as spraying or brushing. In many embodiments curing occurs without addition of moisture. In others final curing occurs by absorption of atmospheric moisture at ambient temperatures and even sub-freezing temperatures. However, if desired, the applied coating can be heated and/or exposed to a source of moisture for quicker curing. Some of such coatings can be cured underwater, for example. The coatings can be applied to new construction and over inorganic primers such as inorganic coatings containing anticorrosion pigments such as metallic zinc.

Coatings containing binders of this invention are usually applied in films of from about 75 to 250 micrometers or in some embodiments up to about 1.2 millimeters in thickness. Generally, the thicker the coating the more resistant it is to attack by chemicals, solvents, heat and weather. If necessary, multiple layers can be applied to the surface to be protected. The preferred dry film thickness is from about 75 to 125 micrometers for a quick drying, fast curing film to provide good protection to the underlying surface.

These and other features of the present invention will become better understood with reference to the following examples.

EXAMPLES 1-6

POLYSILOXANES MANUFACTURED FROM TRIALKOXYSILANES AND SILICONE INTERMEDIATES

The compositions shown in Table 1 are typical embodiments of this invention. The compositions are typically prepared by blending the components in the order shown until a fine dispersion is achieved. The weight percent of each reactant for each example is shown in the typical composition portion of Table 1. The composition in each example has been varied in some manner to affect a particular property as shown in the Physical Properties portion of Table 1.

For each of these examples the weight percent of the amine, organotin compound, solvent, and a first silicone intermediate have remained constant. The variation in the physical properties of each example has been achieved by either varying the silicone and/or oxysilane, adding a carbinol, or varying the amount of pigment or the amount of filler used in the composition.

In this table, silicone intermediate A is Dow Corning 3074 resin (dimethylphenyltrimethoxysilane), silicone intermediate B is Dow Corning Resin Z 6018 (silanol terminated dipropylphenylpolysiloxane with an average molecular weight of about 1600) and the trialkoxysilane is Union Carbide Silane A-163 (methyl trimethoxysilane). The carbinol is an acrylic polyol, namely methyl methacrylate with hydroxyl terminations. The catalyst is dibutyltin dilaurate, amine A is dimethylaminoethanol and amine B is ethylaminoethanol. The solvent in these examples is 55:45 by volume ratio of hexyl acetate and ethyl 3-ethoxypropionate.

application bubbling and is also resistant to continuous heat exposure to 750° F. The composition of Example 2 provides a semigloss self-priming topcoat. The decrease in finish gloss over that in Example 1 is a result of increasing the weight percent of filler in Example 1 from 0 to 200 parts. The coating's other physical properties remain unchanged from that in Example 1. The composition of Example 3 provides a flat self-priming topcoat. The further decrease in finish gloss over that in Example 2 is a result of increasing the proportion of filler in Example 2 from 200 to 400 parts. Again, like Example 2, the coating's other physical properties remain unchanged from that in Example 1.

EXAMPLES 4-6

Examples 4 thru 6 illustrate a trend of increasing depth and distinctiveness in the product's finish as the proportions of silicone intermediates and trialkoxysilane are varied. The composition of Example 4 provides a high gloss self-priming topcoat with excellent flow and leveling. It has outstanding ultraviolet resistance and gloss retention and can be applied to popular zinc-based primers, like inorganic zinc silicate, without application bubbling and is resistant to continuous heat exposure to 750° F.

The composition of Example 5 provides a high gloss self-priming topcoat having increased depth of image over that of Example 4. The increased depth of image results from increasing the proportion of silicone intermediate B to trialkoxysilane from 45:20 in Example 4 to 60:20. The coating's other physical properties remain unchanged from that in Example 4.

The composition of Example 6 provides a high gloss self-priming topcoat having increased depth and distinctness of image over that of Example 5. The increased depth and distinctness of image results from increasing the proportion of silicone intermediate to trialkoxysilane from 60:20 percent in Example 5 to 45:0. Like Example 5, the coating's other physical properties

TABLE 1

| | EXAMPLES 1 to 9 | | | | | | | | |
|---|---|---|---|---|---|---|---|---|---|
| | 1 | 2 | 3 | 4 | 5 | 6 | 7 | 8 | 9 |
| TYPICAL COMPOSITIONS (parts by weight) | | | | | | | | | |
| SILICONE INTERMEDIATE A | 660 | 660 | 660 | 660 | 660 | 660 | 660 | 660 | 660 |
| SILICONE INTERMEDIATE B | 45 | 45 | 45 | 45 | 60 | 45 | 45 | 45 | 45 |
| TRIALKOXYSILANE | 0 | 0 | 0 | 20 | 20 | 0 | 0 | 40 | 0 |
| CARBINOL | 0 | 0 | 0 | 0 | 0 | 0 | 100 | 100 | 100 |
| TiO$_2$ | 600 | 400 | 400 | 500 | 500 | 300 | 500 | 500 | 500 |
| WOLLASTONITE | 0 | 200 | 400 | 0 | 80 | 0 | 0 | 0 | 200 |
| CATALYST | 10 | 10 | 10 | 10 | 10 | 10 | 10 | 10 | 100 |
| AMINE A | 25 | 25 | 25 | 25 | 25 | 25 | 25 | 25 | 25 |
| AMINE B | 25 | 25 | 25 | 25 | 25 | 25 | 25 | 25 | 25 |
| SOLVENT | 45 | 45 | 45 | 45 | 45 | 46 | 45 | 45 | 45 |
| PHYSICAL PROPERTIES | | | | | | | | | |
| GLOSS (60) | 94 | 65 | 20 | 94 | 95 | 95 | 94 | 94 | 65 |
| VISCOSITY (cps) | 18000 | 18000 | 2100 | 1100 | 1100 | 900 | 2100 | 1400 | 2300 |
| DRY TIMES | | | | | | | | | |
| TOUCH (HRS) | 1 | 1 | 1 | 1 | 1 | 1 | 1 | 1 | 1 |
| THRU (HRS) | 4 | 4 | 4 | 4 | 4 | 4 | 6 | 6 | 6 |
| CURE (DAYS) | 3 | 3 | 3 | 3 | 3 | 3 | 3 | 3 | 3 |

EXAMPLES 1-3

Examples 1 thru 3 illustrate a decreasing trend of the resulting binder to form a glossy finish as the weight percent of filler is increased from 0 to 400 parts. The composition of Example 1 provides a high gloss self-priming topcoat with excellent ultraviolet resistance and gloss retention. It can be applied to popular zinc-based primers, such as inorganic zinc silicate, without remain unchanged from that in Example 4.

EXAMPLES 7-9

POLYSILOXANES MANUFACTURED FROM TRIALKOXYSILANES, SILICONE INTERMEDIATES, AND ALIPHATIC CARBINOLS

Examples 7 thru 9 show the effect that adding 100 parts of carbinol to the formulation has on the physical properties of the coating product. While the preparation and manufacturing process for these examples is essentially the same as for Examples 1 thru 6, the addition of carbinol to the formulation provides the desirable physical properties obtained in Examples 1, 4 and 6 at a reduced raw material cost.

The composition of Example 7 provides a high gloss acrylic modified self-priming topcoat with excellent ultraviolet resistance and gloss retention. An advantage of this particular composition is that it permits the formation of the high gloss finish provided in Example 1 at a reduced raw material cost.

The composition of Example 8 provides a high gloss acrylic modified self-priming topcoat with excellent flow and leveling properties. Like the composition of Example 7, it also has excellent ultraviolet resistance and gloss retention. An advantage of this particular composition is that it permits the formation of a high gloss finish having excellent flow and leveling properties as provided in Example 4 at a reduced raw material cost.

The composition of Example 9 provides a semi gloss acrylic modified self-priming topcoat having, like Examples 7 and 8, excellent ultraviolet resistance and gloss retention. An advantage of this particular composition is that it permits the formation of the semi gloss finish provided in Example 3 at a reduced raw material cost.

Accordingly, Examples 1 thru 9 are exemplary of polysiloxane compositions according to this invention displaying gloss retention and ultraviolet resistance properties that represent a significant improvement over the state-of-the-art.

TABLE 2
EXAMPLES 10 TO 16
TYPICAL COMPOSITIONS (parts by weight)

| Raw Material | Example 10 | Example 11 | Example 12 |
|---|---|---|---|
| Oxysilane A | 560 | 555 | 555 |
| Oxysilane B | 50 | — | — |
| Oxysilane C | — | 37 | 37 |
| Oxysilane D | 10 | — | — |
| Polyester | — | 10 | 10 |
| DIDP | 50 | 10 | 10 |
| Acrylic A | 10 | — | — |
| Acrylic B | 10 | — | — |
| Flow agent | — | 20 | 20 |
| Antifoam agent | .1 | .1 | .1 |
| Scratch reducer A | 1 | 1 | 1 |
| Scratch reducer B | 2 | 2 | 2 |
| Wetting agent | 1 | 1 | 1 |
| Organotin | 8 | 8 | 8 |
| Amine | 42 | 43 | 43 |
| Solvent A | 42 | 27 | 27 |
| Solvent B | — | 10 | 10 |
| $TiO_2$ | 421 | 370 | 340 |
| Wollastonite | — | 264 | 340 |

TABLE 3
EXAMPLES 13 TO 16
TYPICAL COMPOSITIONS (parts by weight)

| Raw Material | Example 13 | Example 14 | Example 15 | Example 16 Part A | Example 16 Part B |
|---|---|---|---|---|---|
| Oxysilane A | 350 | 350 | 350 | — | 350 |
| Oxysilane C | 32 | 32 | 32 | — | 32 |
| Oxysilane D | 10 | 10 | 10 | — | 10 |
| Acrylic C | 82 | 82 | 82 | 82 | — |
| Acrylic D | 124 | 124 | 124 | 124 | — |
| DIDP | 37 | 37 | 37 | 37 | — |
| Antifoam Agent | 4 | 4 | 4 | 4 | — |
| Wetting Agent | 1 | 1 | 1 | — | 1 |
| Scratch Reducer A | 1 | 1 | 1 | 1 | — |
| Organotin | 10 | 10 | 10 | 10 | — |
| Amine | 27 | 27 | 27 | 27 | — |
| $TiO_2$ | 340 | 340 | 340 | — | 340 |
| $CaCO_3$ | 140 | 140 | 140 | 150 | — |
| Solvent C | 27 | 27 | 27 | 27 | — |
| Solvent D | 27 | 40 | 60 | — | 27 |
| Acrylic A* | 20 | 20 | 20 | 20 | — |
| Wollastonite | — | 60 | 140 | — | — |

Examples 10 to 12 represent compositions of oxysilane for producing coatings wherein the completed coating has over 90 percent Si—O—Si bonding in the binder. Example 10 represents a composition for producing a coating having a high gloss finish. The composition disclosed in Example 11 produces a coating having a semi-gloss finish. The composition disclosed in Example 12 produces a coating having a flat finish. The differing quantities of powdered wollastonite (calcium silicate) are principally responsible for changing the gloss of the coatings.

Examples 13 to 16 disclose compositions involving a copolymer between an oxysilane and a carbinol, namely an acrylic resin. Examples 13 to 15 are representative compositions which are prepared for sale in a single container. Example 16 is a two component composition sold in two separate containers, where the final coating composition is mixed shortly before it is applied to the surface to be coated. In this Example 16, 63 parts by weight of part A are mixed with 100 parts by weight of part B of the composition for producing the final coating.

The composition disclosed in Example 13 produces a coating having a glossy finish. The composition disclosed in Example 14 produces a coating having a semi-gloss finish. The composition disclosed in Example 15 produces a coating having a flat finish. The composition disclosed in Example 16 produces a glossy finish. The gloss of the Example 16 coating can be reduced all the way to a flat finish by adding wollastonite in proportions similar to those in Examples 14 and 15.

The materials employed in examples 10 to 16 are identified as follows:

Oxysilane A is a liquid methoxy-functional polysiloxane intermediate available from Dow Corning Corp. of Midland, Mich., as their product 3074. It reacts with resins having active hydroxyl groups. It has an average molecular weight of about 1400. Oxysilane B is a liquid hydroxyl functional polysiloxane intermediate also available from Dow Corning under their designation 1-2530. It comprises 80% silicone resin in toluene solvent. It has a high phenyl content and a molecular weight range of from 2000 to 7000. The hydroxyl content is about 3%. Oxysilane C is methacryloxypropyl-trimethoxysilane, $CH_2CCH_3COO(CH_2)_3Si(OCH_3)_3$. A suitable material may be purchased from Dow Corning under their designation Z-6030, or from Union Carbide as A-174. Oxysilane D is a different low molecular weight, hydroxyl functional polysiloxane intermediate available from Dow Corning under their designation Z-6018. It has a molecular weight range of from 2000 to 4000. Additional information concerning the oxysilanes can be obtained from Dow Corning data sheets concerning the products.

The polyester used in examples 11 and 12 in small quantities improves the adhesion of the coating to the underlying substrate. This material is silylated polyester solution available from Union Carbide Corp., New York, N.Y., formerly available under their designation Y-11210, and now designated as Y-11632. DIDP indicates diisodecylphthalate, a plasticizer which also improves moisture resistance of the completed coating.

Acrylic A is a non-functional high molecular weight acrylic such as Acryloid B66 available from Rohm & Haas Co., Philadelphia, Pa. Acrylic A* used in examples 13 to 16 comprises a liquid solution of Acrylic A used for easy blending in the composition. Acrylic B is similar to Acrylic A. It comprises a solution of high molecular weight non-functional acrylic resin such as Acryloid B48n also available from Rohm & Haas. Both of these resins may be used for enhancing the hardness of the final coating. Acrylic C is a polyhydroxy functional acrylic resin available from Rhone-Poulanc, (Interez, Inc., Louisville, Ky.), as their CMD-9014. It comprises 80 weight percent solids in solution in n-butyl acetate. Acrylic D is a different hydroxy functional acrylic resin available from Johnson Polymers, Racine Wis., as Joncryl CDX-588. It comprises 68 weight percent solids in n-butyl acetate solution.

The organotin catalyst used in each of these compositions comprises dibutyltindilaureate. The basic amine used in each of these examples comprises ethylaminoethanol.

A number of additional adjuvants used for preparing the liquid composition or for modifying the coating properties are also included. Thus, the flow control agent in Examples 10 to 12 is tetra hydro naphthalene which is available as Perenol F4HN from Henkel Corporation, Hoboken, N.J. An exemplary antifoam agent comprises AF-70 available from General Electric Polymers, Pittsfield, Mass. The two scratch reducers which also inhibit marring of the coating surface are, for example, Byk 321 and Byk 306 available from Byk-Chemie Corporation, Wallingford, Conn. A suitable wetting agent which is used for enhancing the dispersion of pigments and which also tends to improve the gloss of the coating is Disperbyk 1100 also available from Byk-Chemie.

Each of the compositions also includes a small amount of solvent. Solvent A comprises ethylethoxypropionate. Solvent B comprises oxo-hexyl acetate, $C_6H_{13}O$ $COCH_3$, available from Exxon Chemical Americas, Houston, Tex., as EXXATE 600. Solvent C comprises propylene glycol methyl ether acetate. Solvent D comprises ethylene glycol propyl ether. Pigments $TiO_2$ and $CaCO_3$ are titanium dioxide and calcium carbonate, respectively. As suggested above, the wollastonite is a powder form such as Nyad Wollastonite 1250 used as filler for reducing the gloss of the coating.

Although but a few examples of compositions for forming a polysiloxane coating according to this invention has been described, many variations will be apparent to those skilled in the art. For example, in suitable circumstances, a halogen may be an equivalent substituent group in an ingredient in the coating composition. This may not be universally the case since a vapor released upon curing could be HCl, for example, instead of an alcohol. Since many such variations may be made, it is to be understood that within the scope of the following claims, this invention may be practiced otherwise than specifically described.

What is claimed is:

1. A protective coating composition comprising a binder prepared by combining in an organic basic solution:

(A) a silicon-oxygen bond compound selected from a group consisting of:

(i) oxysilanes having the formula

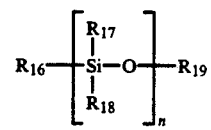

where $R_{16}$, $R_{17}$ and $R_{18}$ are independently selected from the group consisting of hydrogen and alkyl, aryl, cycloalkyl, alkoxy, aryloxy, hydroxyalkyl, alkoxyalkyl and hydroxyalkoxyalkyl groups containing up to six carbon atoms, and where $R_{19}$ is selected from the group consisting of hydrogen and alkyl and aryl groups, where at least two of the groups are oxy substituents for polymerization, and where n is in the range of from 1 to 5; and (ii) silicone intermediates of the formula

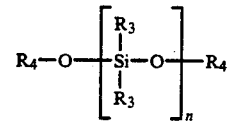

where each $R_3$ is independently selected from the group consisting of the hydroxy group and alkyl, aryl and alkoxy groups having up to six carbon atoms, where each $R_4$ is independently selected from the group consisting of hydrogen and alkyl and aryl groups having up to twelve carbon atoms, and where n is selected so that the average molecular weight of the silicone intermediates is up to 5000;

(B) a basic compound selected from a group consisting of mercaptans, silane substituted amines, polyamides, polyimides, amidoamines, and aliphatic amine compounds and aromatic amine compounds having the general formula

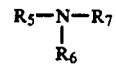

where $R_5$ is selected from a group consisting of hydrogen, and aryl and alkyl groups having up to twelve carbon atoms, and $R_6$ is selected from the group consisting of hydrogen, and aryl and alkyl groups having up to twelve carbon atoms, and where $R_7$ is selected from a group consisting of alkyl, aryl and hydroxyalkyl groups having up to twelve carbon atoms; and (C) an organometallic catalyst.

2. A coating composition as recited in claim 1 wherein the organometallic catalyst comprises an organotin catalyst having the general formula

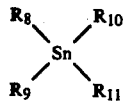

where $R_8$, $R_9$, $R_{10}$ and $R_{11}$ are selected from a group consisting of alkyl, aryl, and alkoxy groups having up to eleven carbon atoms, and any two of $R_8$, $R_9$, $R_{10}$ and $R_{11}$ are also selected from a group consisting of inorganic atoms including halogens, sulphur and oxygen.

3. A coating composition as recited in claim 1 further comprising a carbinol containing an average of at least two carbon bonded hydroxy groups per carbinol, wherein the weight ratio of silicon-oxygen bond compounds to carbinol is greater than 5:1.

4. A coating composition as recited in claim 3 wherein the carbinol is selected from a group of acrylic and polyester carbinol polymers having molecular weights up to 10,000.

5. A coating composition as recited in claim 1 further comprising a silicon compound selected from a group consisting of chloro-silanes, mono-functional oxysilanes, difunctional oxysilanes, alcohols, and silanols.

6. A coating composition as recited in claim 1 further comprising sufficient water to hydrolyze up to 50% of the functionality of the silicon oxygen compounds and sufficient alcohol to keep the coating composition fluid.

7. A coating composition as recited in claim 1 wherein the basic compound comprises an aminosilane with the general formula

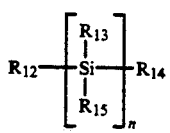

wherein $R_{12}$ is selected from the group consisting of aliphatic and aromatic amines containing from 1 to 6 nitrogen atoms and from 1 to 6 carbon atoms, $R_{13}$, $R_{14}$, and $R_{15}$ are independently selected from the group consisting of alkoxy and aryloxy groups having up to twelve carbon atoms, and n is in the range of from 1 to 6.

8. A coating composition as recited in claim 1 in which each oxy substituent comprises an alkyl group.

9. A coating composition as recited in claim 8 in which each oxy substituent comprises an organic group selected from the group consisting of the methyl and ethyl groups.

10. A coating composition as recited in claim 8 in which the oxy substituents are the same and are selected from the group consisting of the methyl and ethyl groups.

11. A coating composition as recited in claim 1 in which each $R_3$ is independently selected from the group consisting of the hydroxyl, methyl, ethyl, methoxy and ethoxy groups.

12. A coating composition as recited in claim 1 wherein the oxysilane is selected from the group consisting of trialkoxysilanes, triaryloxysilanes and trialkaryloxysilanes.

13. A coating composition as recited in claim 1 comprising at least one oxysilane and at least one silicone intermediate.

14. A protective coating composition as recited in claim 1 wherein the organometallic catalyst is selected from the group consisting of tetramethyltin, tetrabutyltin, tetraoctyltin, tributyltin chloride, tributyltin methacrylate, dibutyltin dichloride, dibutyltin oxide, dibutyltin sulfide, dibutyltin acetate, dibutyltin dilaurate, dibutyltin maleate polymer, dibutyltin dilaurylmercaptide, tin octoate, dibutyltin bis(isooctylthioglycolate), butyltin trichloride, butylstannoic acid, dioctyltin dichloride, dioctyltin oxide, dioctyltin dilaurate, dioctyltin maleate polymer, dioctyltin bis(isooctylthioglycolate) dioctyltin sulfide, and dibutyltin 3-mercapto propionate.

15. A protective coating composition as recited in claim 1 wherein the amine is selected from the group consisting of dimethyl methanolamine, dimethyl ethanolamine, dimethyl propanolamine, dimethyl butanolamine, dimethyl pentanolamine, dimethyl hexanolamine, methyl ethyl methanolamine, methyl propyl methanolamine, methyl ethyl ethanolamine, methyl ethyl propanolamine, mono isopropanolamine, methyl diethanolamine, triethanolamine, diethanolamine, ethanolamine.

16. A protective coating composition as recited in claim 1 wherein n = 1 and the oxysilane is trifunctional.

17. A coating as recited in claim 16 in which the oxy substituents are the same and are selected from the group consisting of the methyl and ethyl groups.

18. A protective coating composition as recited in claim 1 wherein n = 2.

19. A method for forming a protective coating comprising polymerizing at ambient temperatures

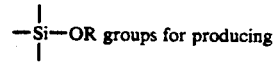

—Si—OR groups for producing

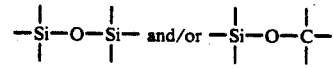

catalyst and an organometallic catalyst.

20. A method as recited in claim 19 further comprising copolymerizing a carbinol with such —Si— containing groups, the carbinol having at least two hydroxyl groups.

21. A method as recited in claim 19 wherein the

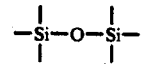

groups are silicones having a molecular weight up to 5000.

22. A method as recited in claim 19 wherein the weight ratio of silicones to oxysilanes is in the range of from 3:2 to 10:1.

23. A method as recited in claim 19 wherein the organometallic catalyst comprises an organotin compound having the general formula

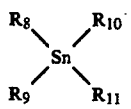

where $R_8$, $R_9$, $R_{10}$ and $R_{11}$ are selected from a group consisting of alkyl, aryl, and alkoxy groups having up to eleven carbon atoms, and any two of $R_8$, $R_9$, $R_{10}$ and $R_{11}$ are also selected from a group consisting of inorganic atoms including halogens, sulphur and oxygen.

24. A method as recited in claim 19 wherein the

groups are in compounds selected from the group consisting of trialkoxysilanes, triaryloxysilanes and trialkaryloxysilanes.

25. An organic protective coating composition comprising a binder prepared by combining:
a hydrolyzable oxysilane;
an amine having the general formula

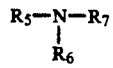

where $R_5$ and $R_6$ are selected from a group consisting of hydrogen, and aryl and alkyl groups having up to twelve carbon atoms, where $R_7$ is selected from a group consisting of alkyl, aryl and hydroxyalkyl groups having up to twelve carbon atoms; and
an organotin compound having the general formula

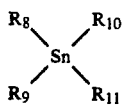

where $R_8$, $R_9$, $R_{10}$ and $R_{11}$ are selected from a group consisting of alkyl, aryl, and alkoxy groups having up to eleven carbon atoms, and any two of $R_8$, $R_9$, $R_{10}$ and $R_{11}$ are also selected from a group consisting of inorganic atoms including halogens, sulphur or oxygen.

26. A protective coating composition as recited in claim 25 wherein the oxysilane comprises a trialkoxysilane having the formula

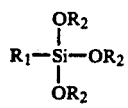

where $R_1$ is selected from the group consisting alkyl, aryl, and cycloalkyl groups containing up to six carbon atoms and where each $R_2$ is independently selected from the group consisting of alkyl, aryl, hydroxyalkyl, alkoxyalkyl and hydroxyalkoxyalkyl groups containing up to six carbon atoms.

27. A protective coating composition as recited in claim 25 further comprising a material copolymerizable with the oxysilane selected from the group consisting of carbinols containing an average of at least two carbon bonded hydroxy groups per carbinol, and silicone intermediates of the formula

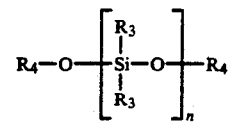

where each $R_3$ is independently selected from the group consisting of the hydroxy group and alkyl, aryl and alkoxy groups having up to six carbon atoms, where each $R_4$ is independently selected from the group consisting of hydrogen and alkyl and aryl groups having up to twelve carbon atoms, and where n is selected so that the average molecular weight of the silicone intermediates is up to 5000.

28. An organic protective coating composition comprising a binder prepared by combining:
a silicone intermediate having a molecular weight up to 5000;
an amine having the general formula

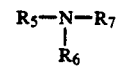

where $R_5$ and $R_6$ are selected from a group consisting of hydrogen, and aryl and alkyl groups having up to twelve carbon atoms, and $R_7$ is selected from a group consisting of alkyl, aryl and hydroxyalkyl groups having up to twelve carbon atoms; and
an organotin catalyst having the general formula

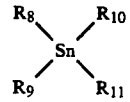

where $R_8$, $R_9$, $R_{10}$ and $R_{11}$ are selected from a group consisting of alkyl, aryl, and alkoxy groups having up to eleven carbon atoms, and any two of $R_8$, $R_9$, $R_{10}$ and $R_{11}$ are also selected from a group consisting of inorganic atoms including halogens, sulphur or oxygen.

29. An organic protective coating composition as recited in claim 28 wherein the silicone intermediates have the general formula

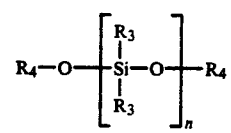

where each $R_3$ is independently selected from the group consisting of the hydroxy group and alkyl, aryl and alkoxy groups having up to six carbon atoms, where each $R_4$ is independently selected from the group consisting of hydrogen and alkyl and aryl groups having up to twelve carbon atoms, and where n is selected so that the average molecular weight of the silicone intermediates is up to 5000.

30. A protective coating composition as recited in claim 29 further comprising a trialkoxysilane having the formula

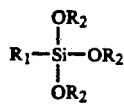

where $R_1$ is selected from the group consisting alkyl, aryl, and cycloalkyl groups containing up to six carbon atoms and where each $R_2$ is independently selected from the group consisting of alkyl, aryl, hydroxyalkyl, alkoxyalkyl and hydroxyalkoxyalkyl groups containing up to six carbon atoms.

31. A protective coating composition as recited in claim 30 further comprising a material copolymerizable with the silicone intermediate selected from the group consisting of carbinols containing an average of at least two carbon bonded hydroxy groups per carbinol and having an average molecular weight in the range of from 62 to 10,000.

32. A coating composition for weather and chemical resistant protective coatings, wherein the binder in the coating is prepared by combining
(i) trialkoxysilanes having the formula

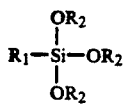

where $R_1$ is selected from the group consisting of alkyl, aryl and cycloalkyl groups containing up to six carbon atoms and where each $R_2$ is independently selected from the group consisting of alkyl, hydroxyalkyl, alkoxyalkyl and hydroxyalkoxyalkyl groups containing up to six carbon atoms;
(ii) aliphatic carbinols containing an average of at least two carbon bonded hydroxy groups per carbinol and having an average molecular weight of at least 62;
(iii) silicone intermediates of the formula

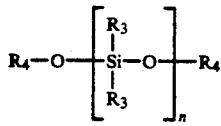

where each $R_3$ is independently selected from the group consisting of the hydroxy group and alkyl, aryl and alkoxy groups having up to six carbon atoms, where each $R_4$ is independently selected from the group consisting of hydrogen and alkyl and aryl groups having up to six carbon atoms, and where n is selected so that the average molecular weight of the silicone intermediates is up to 5000; and
(iv) an organotin catalyst having the general formula

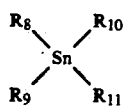

where $R_8$, $P_9$, $R_{10}$ and $R_{11}$ are selected from a group eleven carbon atoms, and any two of $R_8$, $R_9$, $R_{10}$ and $R_{11}$ are also selected from a group consisting of inorganic atoms including halogens, sulphur or oxygen; in the presence of
(v) a basic solution comprising an amine having a general formula

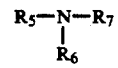

where $R_5$ and $R_6$ are selected from a group consisting of hydrogen, and aryl and alkyl groups having up to six carbon atoms, and $R_7$ is selected from a group consisting of alkyl, aryl and hydroxyalkyl groups having up to six carbon atoms.

33. A coating composition as recited in claim 32 wherein the carbinol is selected from the group consisting of acrylic and polyester carbinol polymers having molecular weights up to 10,000.

34. A coating composition as recited in claim 32 in which $R_1$ is selected from the group consisting of the methyl and ethyl groups.

35. A coating composition as recited in claim 32 in which the $R_2$s are the same and are selected from the group consisting of the methyl and ethyl groups.

36. A method for protecting a surface against weathering or chemical attack comprising the steps of;
combining (i) oxysilanes having the formula

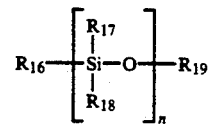

where $R_{16}$, $R_{17}$ and $R_{18}$ are independently selected from the group consisting of hydrogen and alkyl, aryl, cycloalkyl, alkoxy, aryloxy, hydroxyalkyl, alkoxyalkyl and hydroxyalkoxyalkyl groups containing up to six carbon atoms, and where $R_{19}$ is selected from the group consisting of hydrogen and alkyl and aryl groups, where at least two of the groups are oxy substituents for polymerization, and where n is in the range of from 1 to 5; (ii) silicone intermediates of the formula

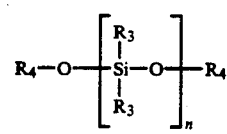

where each $R_3$ is independently selected from the group consisting of the hydroxy group and alkyl, aryl and alkoxy groups having up to six carbon atoms, where each $R_4$ is independently selected from the group consisting of hydrogen and alkyl and aryl groups having up to six carbon atoms, and where n is selected so that the average molecular weight of the silicone intermediates is up to 5000;
(iii) an amine; and (iv) an organotin catalyst having the formula

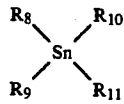

where $R_8$, $R_9$, $R_{10}$ and $R_{11}$ are selected from a group consisting of alkyl, aryl, and alkoxy groups having up to eleven carbon atoms, and any two of $R_8$, $R_9$, $R_{10}$ and $R_{11}$ are also selected from a group consisting of inorganic atoms including halogens, sulphur or oxygen; and applying the resulting composition to a surface to be treated, wherein the oxysilanes and silicone intermediates undergo hydrolysis in the presence of atmospheric moisture and copolymerize to form a binder on the surface.

37. A method as recited in claim 36 in which the oxysilanes are hydrolyzed up to 50% before the applying step.

38. A method as recited in claim 36 wherein the amine has the general formula

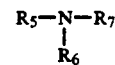

where $R_5$ and $R_6$ are selected from a group consisting of hydrogen, and aryl and alkyl groups having up to twelve carbon atoms, and $R_7$ is selected from a group consisting of alkyl, aryl and hydroxyalkyl groups having up to twelve carbon atoms.

* * * * *

UNITED STATES PATENT AND TRADEMARK OFFICE
CERTIFICATE OF CORRECTION

PATENT NO. : 5,275,645
DATED : January 4, 1994
INVENTOR(S) : Leonard E. Ternoir; Raymond E. Foscante; Roland L. Gasmena It is certified that error appears in the above-identified patent and that said Letters Patent is hereby corrected as shown below:

Abstract, line 4, after "consisting" insert -- of --.
Column 5, line 8, after "consisting" insert -- of --.
Column 7, line 29, replace "a oxysilane" with -- an oxysilane --.
Column 13, line 31, replace "finally divided" with -- finely divided --.
Column 17, lines 34,38, change "semi gloss" to -- semigloss -- (both occurrences).
Column 18, line 29, change "semi-gloss" to -- semigloss--.
Column 20, line 66, replace "R;" with -- $R_7$ --.
Column 22, insert the following on blank line 47 before "catalyst and an organometallic catalyst."

-- polymer groups and $-\underset{|}{\overset{|}{Si}}-O-\underset{|}{\overset{|}{Si}}-$ groups using an amine --

Column 23, line 33, Replace "R;" with -- $R_7$ --.
Column 23, line 37, replace "compound" with -- catalyst --.
Column 23, line 59, after "consisting" insert -- of --.

UNITED STATES PATENT AND TRADEMARK OFFICE
CERTIFICATE OF CORRECTION

PATENT NO. : 5,275,645
DATED : January 4, 1994
INVENTOR(S) : Leonard E. Ternoir; Raymond E. Foscante; Roland L. Gasmena It is certified that error appears in the above-identified patent and that said Letters Patent is hereby corrected as shown below:

Column 25, line 66, replace "$P_9$" with -- $\overline{R}_9$ --.
Column 25, line 67, after "group" insert -- consisting of alkyl, aryl, and alkoxy groups having up to --.

Signed and Sealed this

Thirteenth Day of February, 2001

Attest:

NICHOLAS P. GODICI

Attesting Officer     Acting Director of the United States Patent and Trademark Office